United States Patent [19]

Mifune

[11] Patent Number: 4,662,353
[45] Date of Patent: May 5, 1987

[54] GAS HEATER

[75] Inventor: Hideo Mifune, Hirakata, Japan

[73] Assignee: Matsushita Electric Industrial Co., Ltd., Kadoma, Japan

[21] Appl. No.: 709,913

[22] Filed: Mar. 8, 1985

[30] Foreign Application Priority Data

Mar. 9, 1984 [JP] Japan ................................ 59-45841

[51] Int. Cl.[4] .............................................. F24H 1/00
[52] U.S. Cl. ................ 126/350 B; 126/344; 431/255; 431/281; 43/129
[58] Field of Search ............... 431/196, 198, 201, 255, 431/256, 328, 329, 344, 153, 191, 263, 264, 266; 126/350 B, 408, 209, 409, 208, 282, 265, 266, 227, 253, 254; 43/129

[56] References Cited

U.S. PATENT DOCUMENTS

| | | | |
|---|---|---|---|
| 466,412 | 1/1892 | Hamsley | 126/254 |
| 785,354 | 3/1905 | Fowler | 126/253 |
| 894,954 | 8/1908 | Johansen | 431/281 X |
| 971,010 | 9/1910 | Jewett | 431/266 X |
| 1,118,943 | 12/1914 | Lyon | 431/256 |
| 1,614,798 | 1/1927 | Maehler | 431/256 |
| 2,146,660 | 2/1939 | Swartz | 431/256 |
| 2,171,691 | 9/1939 | Geisler | 126/350 B |
| 2,303,868 | 12/1942 | Stuckenholt | 431/256 X |
| 2,921,176 | 1/1960 | Scofield | 431/256 X |
| 3,509,388 | 4/1970 | Mifune et al. | |
| 3,525,325 | 8/1970 | Perl | 431/329 X |
| 3,662,737 | 5/1972 | Richards | 431/329 X |
| 3,785,362 | 1/1974 | Okui | 126/208 |
| 3,804,075 | 4/1974 | Rummel | 126/267 X |
| 4,139,792 | 2/1979 | Kondo . | |
| 4,252,520 | 2/1981 | Beatko | 431/328 |
| 4,354,482 | 10/1982 | Beisecker | 126/409 |
| 4,422,845 | 12/1983 | Yamaguchi | 431/153 |
| 4,458,667 | 7/1984 | Hsieh | 431/329 X |
| 4,502,465 | 3/1985 | Yoshinaga et al. | 126/409 |
| 4,512,328 | 4/1985 | Arad | 126/265 X |

FOREIGN PATENT DOCUMENTS

| | | | |
|---|---|---|---|
| WO84/01264 | 4/1984 | PCT Int'l Appl. . | |
| 183791 | 4/1936 | Switzerland | 431/256 |
| 16388 | of 1914 | United Kingdom | 431/256 |

Primary Examiner—Carroll B. Dority, Jr.
Attorney, Agent, or Firm—Cushman, Darby & Cushman

[57] ABSTRACT

A gas heater for heating a mat 12 soaked with an insecticide or the like, is heated by a catalyst reaction of a combustion gas, e.g. butane comprises a gas container 1, a gas burner 5 surrounded by a catalyst 6 which are contained in a burner 3 with apertures 3a, through which a pilot flame 81 from a pilot nozzle 8 ignited by a high voltage generator 9 is blown; a main valve 41 for the gas burner 5 and a pilot valve 82 for the pilot nozzle 8 and a high voltage generator 9 are controlled in a interlinked fashion.

4 Claims, 1 Drawing Figure

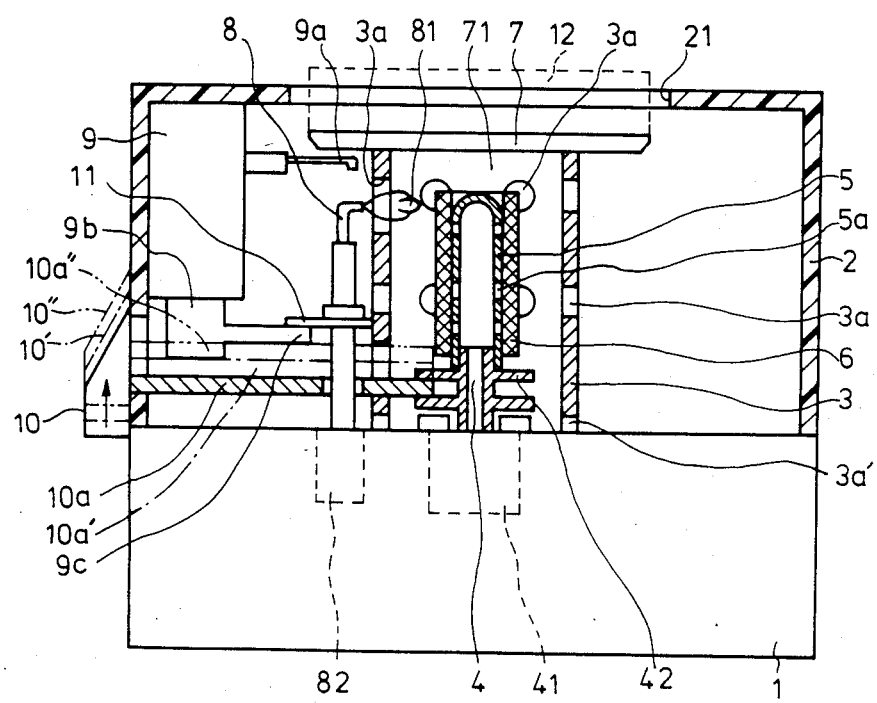

GAS HEATER

BACKGROUND OF THE INVENTION

1. Field of the Invention

The present invention relates generally to a gas heater utilizing catalyst reaction of a combustion gas, and particularly concerns a portable gas heater which can be started safely and easily by a simple operation for moderate warming of a heating plate for holding a heating object, such as a mat soaked with an insecticide.

2. Description of the Prior Art

In recent years, trials are made to react butane or the like combustion gas with metal catalyst such as platinum or the like for applying resultant heat in heating portable hair curler, portable insence radiator, portable insecticide radiator, etc. The above-mentioned portable apparatuses utilizing the catalyst reaction of the combustion gas are paid attention since wide utilizations and development are expected owing to their features that no electric power is used.

On the other hand, from many years ago, insecticide-mat-heating apparatus for evaporating insecticide soaked in a mat by heating a filament heater or a semiconductor heater by use of commercial electric power source. However, such conventional electric mat heater requires a considerably large electric power to raise the heating plate to a certain temperature enough to evaporate the insecticide, such as 150° C. Accordingly, due to shortage of necessary power to raise the temperature, the insecticide mat heating apparatus has not been able to be electrified.

Besides, a catalyst heater apparatus was recently trial-manufactured. This is configured to use a dry cell as its starting means, wherein an electric filament is red-heated to ignite combustion gas. Such trial-manufactured apparatus has problems of dry cell replacement, taking some time to ignite the combustion gas by red-heating the filament and insufficient reliability of starting. Furthermore, since an initial ignition of the combustion gas is carried out in a burning chamber which is originally designed for the catalyst-reaction, condition for igniting is dissatisfactory because of excessive contents of the combustion gas, shortage of air, etc. Therefore, such apparatus has, on top of the unreliability of the ignition, a liability of making big explosion sound at the time of ignition. Such sound is not only uncomfortable for the user, but also is undesirable for safety and service life time of the apparatus.

SUMMARY OF THE INVENTION

Accordingly, in view of the above-mentioned problems of the conventional apparatuses, the present invention aims to provide an improved portable gas heater, which is suitable for use in heating an insecticide mat, or the like and has high reliability in starting of catalyst reaction.

A gas heater in accordance with the present invention comprises:

a gas container, a main gas nozzle which is provided on the gas container, a gas burner which is provided connected to the main gas nozzle and has gas outlet apertures, a catalyst member disposed outside the gas burner, a burner pipe which is provided surrounding the gas burner and the catalyst member and has apertures, a heating plate provided above the burner pipe as a holding table for holding a heating object, a pilot nozzle provided outside the burner pipe in a relation to blow a pilot gas flame through one of the aperture to the gas burner, for starting of burning of gas at the gas burner thereby to start a catalyst reaction, and ignition means for igniting gas blown from the pilot nozzle to make the pilot gas flame.

The gas heater having the constitution as above-described has a high reliability in start of catalyst reaction, safety and comfortableness because making no fire, flame or smoke, good efficiency of gas because of the catalyst combustion and a convenience of portableness since no commercial electric power is required. Furthermore, the starting operation of the gas heater can be made with a simple operation.

BRIEF DESCRIPTION OF THE DRAWING

The attached drawing is a partly sectional elevation view of a gas heater, as a preferred embodiment, of the present invention.

DESCRIPTION OF THE PREFERRED EMBODIMENT

Detailed constitution and operation of the preferred embodiment are described with reference to the accompanying drawing hereafter.

On a gas container 1, a casing 2 having an opening 21 for placing a mat therein is provided. In the casing 2, a burner pipe 3 having apertures 3a, 3a for passing air therethrough are fixed on the gas container 1. The aperture may be a gap 3a' between the lower end of the burner pipe 3 and the upper face of the gas container 1. Further, in the burner pipe 3, a main gas nozzle 4 having flanges 42 is provided by connecting its lower end to a known main valve 41 of known construction provided in the gas container 1. On the upper end of the main gas nozzle 4, a gas burner 5 having several gas apertures 5a, 5a is provided. On the outer face of the gas burner 5, a catalyst 6 is provided to surround the former in a manner that the catalyst, such as fine platinum wires are disposed in the vicinity of the outer face of the gas burner 5.

On the upper end of the burner pipe 3, a heating plate 7 which serves as a holder for receiving a heating object, such as an insecticide mat 12 put in the upper opening 21 of the cases, is provided with an appropriate gap space 71 on the upper end of the gas burner 5. Outside and close to the burner pipe 3, a pilot nozzle 8 having a pilot nozzle lever 11 is provided by connecting its lower end to a pilot valve 82 of known construction provided in the gas container 1. The upper end of the pilot nozzle 8 is bent toward the gas burner 5 so as to blow a pilot gas flame 81 through one of the aperture 3a of the burner pipe 3 onto the gas burner 5. Further, in the space of the casing 2, a discharge electrode 9a is provided in a close proximity to the outlet end of the pilot nozzle 8. And, the discharge electrode 9a is connected to an output terminal of a piezoelectric high voltage generator 9. An end tip 9c of an actuating member 9b of the piezoelectric high voltage generator 9 pushes up a pilot nozzle lever 11 of the pilot nozzle 8. A slide control element 10, which is provided slidably on the outer face of the casing 2, has a main lever 10a which is coupled to the flanges 42 of the main nozzle 4. Furthermore, the main lever 10a faces a lower end of the actuating member 9b with a specified gap inbetween. The slide control element 10, hence the main lever 10a has the following three positions: (1) a resting state shown by a solid line designatad by 10 and 10a, which is the lowest position, wherein both the main valve 41 and the pilot valve 82 are closed stopping flow of the gas, and the piezoelectric high voltage generator 9 as an ignition means is off; (2) a starting position shown by two-dot chain line designated by 10" and 10a", which is at the opposite end with respect to the position of the side control element 10 whereat the main valve 41 has been opened and the pilot valve 82 is opened, and a short time thereafter an igniting operation of the piezoelectric high voltage generator 9 takes place, and (3) a steady state heating position shown by one-dot chain line designated by 10' and 10a', which is between the resting position and the starting position, whereat the main valve 41 is opened and the pilot valve 82 is closed, and the ignition means is off.

Operation of the gas heater configurated as above is as follows. First, the slide control element 10 is pushed up from the resting position which is at the lowest position to the starting position which is the highest position of the control knob 10. As a result of the upward motion of the control knob 10, hence the main lever 10a, the main nozzle 4 is pushed up and the main valve 41 is opened, and little time thereafter by pushing up of the actuating member 9b by the main lever 10a, pilot nozzle 8 is pushed up and valve 82 is opened. And finally, as a result of the pushing up motion of the actuating member 9b, the piezoelectric high voltage generator 9 generates a high voltage pulse, which is impressed on the discharge electrode 9a. Therefore, a high voltage sparking takes place between the discharge electrode 9a and the outlet end of the pilot nozzle 8, thereby igniting the gas flow from the pilot nozzle 8 to produce a pilot gas flame 81 which blows on the gas burner 5 having the catalyst 6 thereon. Then, the gas burner 5 is heated by the pilot burner 81, and accordingly by the function of the catalyst 6, the gas flowing out from the gas apertures 5a reacts with oxygen in the air coming through the apertures 3a the burner pipe 3 starting a catalyst reaction.

Once the catalyst reaction started, the slide control element 10 is placed to the middle position, namely the steady state heating position, by means of a restoring spring (not shown) included in the generator 9. At this middle position, the pilot valve 82 is closed and only the main valve 41 is opened, whereat the catalyst reaction is stably continued. As a result of this catalyst reaction of the combustion gas, the space in the burner pipe 3 is moderately heated, and therefore the heating plate 7 fixed thereon is heated to a moderate temperature, for instance, 150° C. Therefore, a mat soaked with an insecticide, a germicide, an air freshner or deodorizer or the like which is put on the heating plate 7 is moderately heated and valatilizes the above-mentioned soaked contents.

When the slide control element 10 is pushed down to its bottom position, namely the resting position, both the main valve 41 and the pilot valve 82 are closed, and thereby the heating is completely stopped. As the above-mentioned piezoelectric high voltage generator 9, for instance, known apparatus disclosed in the U.S. Pat. No. 3,509,388 or the U.S. Pat. No. 4,139,792 is suitable. These arts disclose the piezoelectric high voltage generator which generates the high voltage by impressing a mechanical motion to piezoelectric element, and are widely used in cigarette lighters or gas ovens. Of course, other kinds of high voltage igniting means such as high voltage oscillator is similarly usable.

Since catalyst reaction of the combustion gas is utilized, no smoke or flame is produced in the gas heater of the present invention. Accordingly, the combustion efficiency is very high. Since there is no flame or smoke, the gas heater is usable as a safe portable gas heater in any place. Furthermore, there is no need of using the commercial electric power line or expensive and heavy dry batteries. Since the heat from the gas burner 5 is conducted to the heating plate by a rising air flow disposed with a predetermined air gap from the gas burner 5, the surface of the heating plate 7 is moderately heated, and therefore, there is no fear of accidental burning through excessive heating of the mat 12 put thereon. Since a combustion gas contained in the gas container 1 is used as the energy source, the gas heater can be used for very long time. Or in other words, the volume of the gas container can be very small for ordinary use for the insecticide, the germicide, the room freshner or deodorizer. This gas heater makes no blasting sound at the starting, since the catalyst reaction is started by heating the gas burner 5 by means of a pilot flame 81 having sufficient heat from the pilot nozzle 8. Therefore, the apparatus is safe and reliable. The safe ignition is further assured by the use of the high voltage ignition means 9 and 9a.

What is claimed is:

1. A gas heater comprising:
   a gas container,
   a main gas nozzle on said gas container,
   a gas burner having gas outlet apertures connected to said main gas nozzle,
   a catalyst member disposed adjacent said gas burner,
   an upright burner pipe having air inlet apertures surrounding said gas burner and said catalyst member, and having an open upper end,
   a heating plate above said burner pipe for holding an object to be heated, said heating plate being larger than said upper open end of said burner pipe,
   a pilot nozzle adjacent said burner pipe in position to blow a pilot gas flame through one of said pipe apertures to said gas burner for igniting gas emitted from said gas burner thereby to start a catalyst reaction, and
   ignition means for igniting gas blown from said pilot nozzle to make said pilot gas flame.

2. A gas heater in accordance with claim 1, wherein said ignition means comprises a discharging electrode disposed with a gap in the vicinity of the outlet of said pilot nozzle and a piezo-electric high voltage generator for applying a high voltage across said pilot nozzle and said electrode.

3. A gas heater in accordance with claim 1 which further comprises manually-operable means linked to a main valve for closing or opening gas-flow from said gas container to said main nozzle, linked to a pilot valve for closing or opening gas-flow from said gas container to said pilot nozzle and linked to said ignition means for generating a high voltage for ignition.

4. A gas heater in accordance with claim 3, wherein said manually operable means has the following three positions:
   (1) a resting position whereat both said main valve and said pilot valve are closed and said ignition means is off,
   (2) a starting position whereat said main valve and said pilot valve are open and subsequently an igniting operation of said ignition means is made,
   (3) a heating position, between said resting and starting positions, whereat said main valve is open, said pilot valve is closed by a restoring spring provided in said ignition means and said ignition means is off.

* * * * *